United States Patent [19]

Berkhoel

[11] 4,199,334
[45] Apr. 22, 1980

[54] SELF-CLEANING AIR FILTER

[75] Inventor: James L. Berkhoel, St. Paul Park, Minn.

[73] Assignee: Donaldson Company, Inc., Minneapolis, Minn.

[21] Appl. No.: 909,841

[22] Filed: May 26, 1978

[51] Int. Cl.² .......................................... B01D 46/04
[52] U.S. Cl. ..................................... 55/304; 55/497; 55/DIG. 3
[58] Field of Search ................. 55/283, 288, 304, 305, 55/381, 493, 497, 498, DIG. 3, 457, 500, 521; 15/347, 352

[56] References Cited

U.S. PATENT DOCUMENTS

| 980,832 | 1/1911 | Pittelkow | 55/482 |
|---|---|---|---|
| 1,887,052 | 11/1932 | Wendelin | 55/521 |
| 2,242,278 | 5/1941 | Yonkers, Jr. | 55/500 |
| 2,350,011 | 5/1944 | Black | 55/304 |
| 2,409,078 | 10/1946 | Swann | 55/493 |
| 2,503,568 | 4/1950 | Timm | 55/304 |
| 2,788,860 | 4/1957 | Turner | 55/400 |
| 2,994,407 | 8/1961 | Van Diepenbroek | 55/317 |
| 3,078,650 | 2/1963 | Anderson et al. | 55/337 |
| 3,116,990 | 1/1964 | Duer | 55/294 |
| 3,447,290 | 6/1969 | Flory | 55/322 |
| 3,458,050 | 7/1969 | Cooper | 210/443 |
| 3,486,314 | 12/1969 | Herrington | 55/408 |
| 3,819,052 | 6/1974 | Firth | 210/90 |
| 3,858,793 | 1/1975 | Dudrey | 233/2 |
| 4,067,708 | 1/1978 | Bykhover et al. | 55/304 |
| 4,135,899 | 1/1979 | Gaver | 55/493 |

FOREIGN PATENT DOCUMENTS

| 114660 | 4/1926 | Switzerland | 55/500 |
|---|---|---|---|
| 272544 | 9/1927 | United Kingdom | 55/288 |
| 461735 | 4/1975 | U.S.S.R. | 55/304 |

OTHER PUBLICATIONS

Donaldson Company, Inc. Bulletin No. 1200-272, "At Last!. A Premium Air Cleaner that gives you the Design Flexibility you need.", 1976.

Primary Examiner—David L. Lacey
Attorney, Agent, or Firm—Merchant, Gould, Smith, Edell, Welter & Schmidt

[57] ABSTRACT

An apparatus for filtering particulate material from air and for removing the particulate material collected upon a filter is disclosed. The apparatus includes a housing having an inlet and an outlet. A hollow longitudinally extending filter is secured within the housing for filtering particulate material from the air passing from the inlet to the outlet. The hollow filter has a relatively rigid configuration but still is capable of being distorted. The hollow filter is formed of a pleated porous material. One longitudinal end of the filter is secured relative to the housing and a closure plate is secured to the other longitudinal end. A mechanism is provided for moving the plate to distort the filter and remove particulate material collected thereon.

12 Claims, 4 Drawing Figures

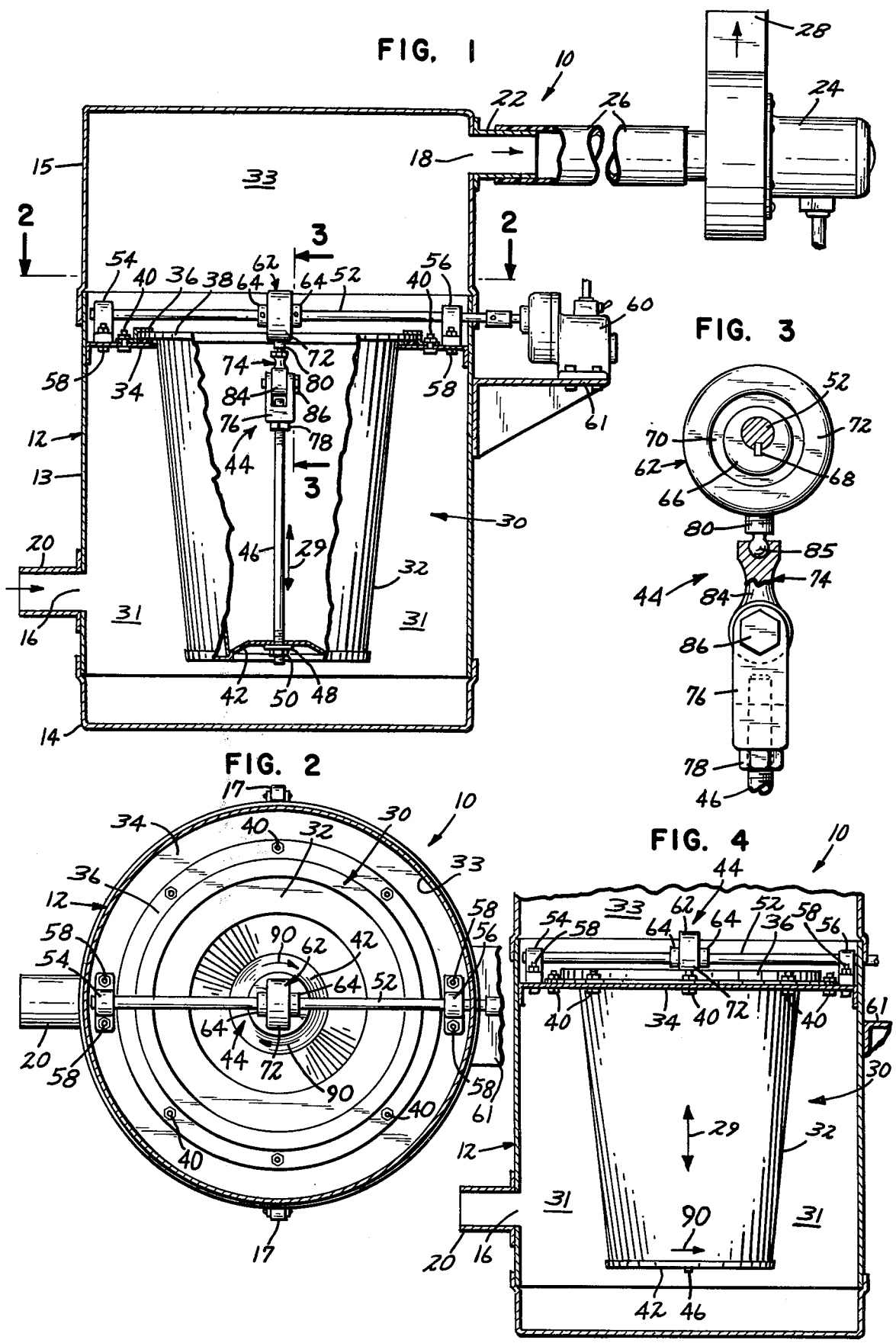

SELF-CLEANING AIR FILTER

BACKGROUND OF THE INVENTION

The present invention relates broadly to devices for filtering particulate material from a gaseous medium. The present invention finds particular application to industrial cabinet-type collectors. Cabinet collectors are used to collect shavings, filings, and the like, produced in machining, grinding or cutting processes, and to collect dust in industrial and pharmaceutical settings. An intake or suction nozzle is placed adjacent a machining tool to collect the particulate material produced during the machining process. The particulate material-laden air is transported to a plenum containing a filtering element which removes a substantial portion of the particulate material from the air.

One type of filter utilized in cabinet collectors is made of pouches sewn from cotton sateen with an internal wire mesh separator. As particulate material collects upon the pouches, a cleaning operation must be performed to remove the particulate material. The pouches may be periodically cleaned by a foot-operated mechanism which shakes the filters or by a motor-driven mechanism which also shakes the filter pouches.

The present invention relates to a novel apparatus for cleaning the particulate material collected upon a filter made of a pleated porous media. By pleating a porous media a large amount of filtering surface can be confined in a small area. Thus, a filter made of a pleated porous media has a larger filtering surface than a conventional bag or pouch filter.

SUMMARY OF THE INVENTION

The apparatus of the present invention is designed to remove particulate material from air passing through a filter and to remove the particulate material collected upon the filter. The apparatus includes a housing having an inlet and an outlet. A hollow longitudinally extending filter is secured within the housing for filtering particulate material from the air passing from the inlet to the outlet. The hollow filter is formed of a pleated porous media. One longitudinal end of the filter is secured relative to the housing and a closure plate is secured to the other longitudinal end. A mechanism is provided for moving the plate to distort the filter and remove particulate material collected thereon.

In the preferred embodiment, the pleated porous media has a generally frusto-conical configuration. The pleats of the filter run generally parallel to the axis of the filter. Also, in the preferred embodiment, the mechanism for moving the plate includes a means for moving the plate upwardly and downwardly while permitting the plate to rotate and the filter to twist.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

BRIEF DESCRIPTION OF THE DRAWING

FIG. 1 is a partial cross-sectional and a partial elevational view of an apparatus embodying the invention, parts being broken away for clarity.

FIG. 2 is a view taken along lines 2—2 of FIG. 1.

FIG. 3 is a view taken along lines 3—3 of FIG. 1.

FIG. 4 is a partial cross-sectional and a partial elevational view illustrating a distorted filter.

DETAILED DESCRIPTION OF THE PREFERRED EMBODIMENT

Referring to the drawings in detail, wherein like numerals indicate like elements, there is shown an apparatus in accordance with the present invention designated generally as a 10. The apparatus 10 includes a housing 12 with a central section 13, a removable bottom section 14 and a removable top section 15. Conventional clamps 17 may be used to secure the sections 14, 15 to the central section 13. FIG. 2 illustrates the clamps 17 which secure the top section 15 to the central section 13. An air inlet 16 is formed in the lower portion of the housing 12. An air outlet 18 is provided in the upper portion of the housing 12.

A pipe 20 extends outwardly from the housing 12 at inlet 16 and a pipe 22 extends outwardly from the housing 12 at outlet 18. The pipes 20, 22 serve as coupling members for conduits leading to and from the apparatus 10. Any conventional conduit coupling device can be utilized as the pipes 20, 22. A vacuum or suction pump 24 communicates with the outlet 18 by way of a conduit 26 and the pipe 22. The outlet from the pump 24 is shown diagrammatically as 28. Any conventional vacuum pump can be utilized with the apparatus 10 so long as the power of the selected pump is sufficient to move particulate material-laden air from a source to the inlet 16, through the housing 12 and to the outlet 28.

A filtering mechanism, designated generally as 30, is secured within the housing 12. The filtering mechanism 30 includes a filter 32 which is removably secured to a flange or partition 34. The flange or partition 34 divides the housing 12 into a first chamber or inlet chamber 31 and a second chamber or outlet chamber 33. The flange 34 is fixedly secured to the inner walls of the housing 12. The filter 32 extends downwardly through an aperture in flange 34 and is removably secured to the flange 34 by means of a clamp 36. The filter 32 thus extends in a generally vertical direction along its axis, illustrated as arrow 29. The clamp 36 secures an annular rim 38 of the filter 32 between a portion of the clamp 36 and the flange 34. Any suitable means, such as nuts and bolts 40, secure the clamp 36 to the flange 34.

The filter 32 is made of a pleated porous media, preferably a pleated porous paper-like material made from a cellulose fiber material or an inorganic material. The filter 32 is also preferably shaped in a frusto-conical configuration. A closure plate 42 is secured to the lower longitudinal end of the filter 32. As seen in FIGS. 1 and 4, the lower longitudinal end of the filter 32 has a transverse dimension or diameter smaller than that of the opposite longitudinal end. The plate 42 is imperforate and closes or seals the lower end of the filter 32. The inlet chamber or plenum 31 is thus bounded by the flange 34, the outer surface of the filter 32, the plate 42 and the interior of the housing 12 which surrounds the filter 32. In this manner, air flowing from the inlet 16 to the outlet 18 must pass radially through the filter 32. The pump 24 maintains a higher pressure in the first chamber 31 than in the second chamber 33 so that air is conducted to the first chamber, radially through the filter 32 and to the second chamber 33. The filter 32 thus separates the particulate material out of the air as the air passes through the filter 32. A portion of the particulate material which is separated from the air collects on the outer surface of the filter 32. In order to assure the continued efficiency of the filtering process, the filter 32 must be periodically cleaned to remove the particulate material collected thereon.

In the present invention, the filter 32 is cleaned by periodically distorting the filter 32. A mechanism, designated generally as 44, moves the plate 42 and distorts the filter 32. The mechanism 44 includes a rod 46 which is attached to the plate 42 and is moved in an upward and downward direction. The rod 46 is preferably removably attached to the plate 42 by any suitable means such as washer 48 and nut 50. The rod 46 should be attached to the plate 42 in such a manner that air does not leak through the juncture between the rod 46 and the plate 42, but rather is constrained to move through the filter 32. Similarly, the juncture between the plate 42 and the filter 32, and the flange 34 and the filter 32 should be airtight so that air is constrained to move through the filter 32.

A drive shaft 52 is rotatably mounted within bearings 54, 56. The shaft 52 is disposed generally transversely to the rod 46. The bearings 54, 56 are removably attached to the flange 34 by any suitable means, such as nuts and bolts 58. A motor 60 is provided for rotating the shaft 52. Any suitable electric or pneumatic motor may be utilized. A 1/15 horsepower electric motor, which rotates at 350 r.p.m., has been found suitable. As seen in FIG. 1, the motor 60 is supported on a platform 61 which is attached to an outer wall of the housing 12.

An eccentric bearing member 62 is utilized to convert the rotary motion of shaft 52 to the upward and downward motion of the rod 46. The eccentric bearing member is affixed in a lateral position on the shaft by a pair of set collars 64. The eccentric bearing member 62 includes an offset eccentric plate 66 which is fixedly secured to the rotatable shaft 52. The shaft 52 and the plate 66 are held fixedly to one another by any suitable means, such as key pin 68. An insert bearing 70 is fixedly secured to the offset eccentric plate 66 for rotation therewith. A bearing sleeve 72 is received about the insert bearing 70 and is freely rotatable relative to the insert bearing 70 and the shaft 52.

When the drive shaft 52 is rotated, the offset placement of the eccentric plate 66 causes the insert bearing 70, which is rotating in unison with the plate 66, to cyclically raise and lower the bearing sleeve 72.

The rod 46 is connected to the bearing sleeve 72 by a coupling member 74. The coupling member 74 includes a yoke 76. The rod 46 screws into a tapped hole within the yoke 76 and is secured thereto by a nut 78. A pin 80 extends from the bearing sleeve 72. A connecting member 84 is connected to the lower end of the pin 80. The connecting member 84 is freely rotatable about the longitudinal axis of the pin 80 by ball and socket joint 85. The connecting member 84 has a hole extending through its lower section. A bolt 86 passes through holes in the yoke 76 and the hole through the connecting member 84. Since the connecting member 84 is rotatable about the pin 80, the rod 46 is also rotatable about its axis.

The rod 46 is thus drivingly connected to the drive shaft 52. The upward and downward motion of the rod 46 in turn moves the plate 42 upwardly and downwardly. This motion compresses the filter 32. The compression of the filter 32 causes the filter to twist. The ability of coupling member 84 to rotate about pin 80 allows the filter 32 to twist. The driven downward motion of the plate 42 snaps or forces the filter back to its undistorted and untwisted state. This distortion and twisting action in turn causes the particulate material collected upon the filter 32 to fall from the filter 32 to the removable bottom section 14. FIG. 4 illustrates the plate 42 in a raised position wherein the filter 32 has twisted in the direction of arrow 90. Depending upon the filter which is used in the apparatus 10, the filter 32 may twist in a direction opposite arrow 90. After the cleaning process has been completed, the bottom section 14 can be removed and the particulate material collected therein disposed of.

When the pump 24 is operative and the apparatus is functioning as a filtering mechanism, the motor 60 is preferably not driven. Only after the apparatus 10 has operated for a certain amount of time and a certain amount of particulate material has collected on the outer surface of the filter 32 will the motor 60 be activated. The motor 60 may be activated manually by an on-off switch or by any suitable automatic means. A timing means may be used to cyclically start the motor 60. Alternatively, a relay may be utilized to temporarily drive the motor 60 at the end of a filtering cycle.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed:

1. Self-cleaning apparatus for removing particulate material from air comprising:
   (a) a housing having an air inlet and an air outlet;
   (b) partition means for dividing the interior of said housing into an air inlet chamber and an air outlet chamber, said partition means having an aperture formed through it;
   (c) a filtering means comprising a hollow, tubular filter having a relatively rigid configuration capable of being distorted;
   (d) said filter having opposite open ends and a longitudinal axis extending between said ends, said filter being formed of a pleated porous media;
   (e) a closure plate secured to one of the ends of said filter;
   (f) means mounting said filter to said partition means in said housing with said axis extending generally vertically, said mounting means including means removably securing the other end of said filter relative to said partition means so as to provide fluid communication between the interior of said filter and said aperture in said partition means, and means sealing the exterior of said filter from fluid communication to said air outlet chamber except to by passage through said filter whereby air laden with particulate material moving from said inlet to said outlet passes through said filter into the interior thereof and deposits particulate material on the outer surface of said filter;

(g) means for removing particulate material collected on the outer surface of the filter, said particulate material removing means including means connected to said plate for moving said plate upwardly and downwardly to thereby distort the filter; and (h) said plate moving means including a rod having one end attached to said plate and extending transverse thereto, means coupling said rod to a motor means for raising and lowering said rod while allowing the rotation of said rod about its axis whereby said plate is raised and lowered to compress said filter element which is permitted to twist during the compression due to the rotation of said rod.

2. An apparatus in accordance with claim 1 including means for moving air from said inlet, through said filter and out said outlet.

3. An apparatus in accordance with claim 1 wherein said motor means includes a rotatable drive shaft supported generally transverse to said rod, a drive motor coupled to said shaft for rotating said shaft, an eccentric bearing member connected to said shaft and coupled by said coupling means to said rod to convert the rotary motion of said shaft to the upward and downward motion of said rod.

4. An apparatus in accordance with claim 3 wherein said eccentric bearing member includes an eccentric plate fixedly secured to said drive shaft for rotation therewith and a bearing sleeve surrounding and supported by said eccentric plate, said bearing sleeve being rotatable relative to said eccentric plate, said coupling means including a yoke attached to the upper end of said rod, a connecting member rotatably attached to said bearing sleeve and said connecting member also being pivotably attached to said yoke.

5. An apparatus in accordance with claim 1 wherein said filter has a generally frusto-conical configuration so that one end of said filter has a larger diameter than the other end, the pleats of said porous media extending generally parallel to the axis of said filter, and the end of said filter with the larger diameter being secured relative to said housing and said plate being secured to the other longitudinal end.

6. An apparatus in accordance with claim 1 wherein the end of said rod attached to said plate is the lower end of said rod and said rod extends upwardly into the interior of said filter, and said coupling means couples the upper end of said rod to said motor means.

7. Self-cleaning apparatus for filtering particulate material from air comprising:
  (a) a housing having an inlet and an outlet;
  (b) a flange extending inwardly from the interior walls of said housing and having an aperture therethrough;
  (c) filtering means for removing particulate material from air passing from said inlet to said outlet;
  (d) said filtering means being comprised of a hollow frusto-conically shaped filter having opposite open ends, one of said ends having a larger diameter than the other end, and said filter being made of a pleated porous media;
  (e) the end of said filter having the larger diameter being removably secured to said flange around said aperture with the filter extending downwardly therefrom, and the other longitudinal end having a closure plate secured thereto;
  (f) the area bounded by said flange, an outer surface of the filter, the plate and the housing which surrounds the filter forming an inlet chamber, said inlet chamber being in communication with said inlet, whereby air passing from said inlet to said outlet must pass through said filter and said aperture, and particulate material in said air collects on the outer surface of said filter; and
  (g) means for moving said plate upwardly and downwardly to distort the filter and remove particulate material collected thereon, said plate-moving means including a rod extending from said plate, a rotary drive shaft, means for supporting said drive shaft generally transversely to said rod, an eccentric bearing member connected to said drive shaft, means for coupling said eccentric bearing member to said rod while permitting the rotation of said rod about its axis, and means for rotating said drive shaft whereby the rotation of said drive shaft is converted into the upward and downward movement of said rod by said eccentric bearing member.

8. An apparatus in accordance with claim 7 wherein the pleats of said porous media run generally parallel to said longitudinal axis of said filter.

9. An apparatus in accordance with claim 7 wherein said eccentric bearing member includes an offset eccentric plate fixedly secured to said drive shaft for rotation therewith and a bearing sleeve received about and freely rotatable with respect to said offset eccentric plate and wherein said coupling means includes a connecting member rotatably connected to the bearing sleeve of said eccentric bearing member and attached to said rod.

10. Self-cleaning apparatus for filtering particulate material from air comprising:
  (a) a housing having an inlet and an outlet;
  (b) filtering means comprised of a frusto-conically shaped filter for removing particulate material from air passing from said inlet to said outlet;
  (c) means for moving air from said inlet, through said filtering means to said outlet;
  (d) said filter having opposite open ends, one being larger than the other, and a longitudinal axis extending between the ends, and said filter being made of a pleated porous media, the pleats of said porous media running generally parallel to the longitudinal axis of said filter;
  (e) means removably securing the larger end of said filter to said housing with said longitudinal axis extending generally vertically and the other end of said filter having a closure plate secured thereto;
  (f) an inlet chamber being formed in an area bounded by said filter securing means, an outer surface of said filter, said plate and said housing which surrounds the filter whereby air passing from said inlet to said outlet must pass from said inlet chamber through said filter and particulate material in said air collects on said outer surface of the filter;
  (g) means for moving said plate upwardly and downwardly to distort said filter and remove particulate material collected thereon;
  (h) said means for moving the plate including a rod extending from said plate, a rotary drive shaft, means for supporting said rotary drive shaft generally transversely to said rod, an eccentric bearing member received about said drive shaft for converting the rotary motion of said drive shaft to upward and downward motion, means for coupling said eccentric bearing member to said rod while allowing said rod to rotate about its axis, and means for rotating said drive shaft whereby the rotation of said drive shaft is converted into the upward and downward motion of said rod and the plate secured thereto.

11. Self-cleaning apparatus for cleaning air laden with particulate material comprising:
   (a) a housing;
   (b) a partition dividing said housing into first and second chambers, said partition having an aperature to provide communication between said first and second chambers;
   (c) a filter element comprising a hollow tube of pleated porous media, said tube having a longitudinally extending axis and having one closed end and one open end;
   (d) means for mounting said filter element in the first chamber with said longitudinally extending axis extending generally vertically, and with the open end fixed relative to the housing above said closed end and communicating with said aperature;
   (e) means for moving air from said first chamber, through said filter element to said second chamber;
   (f) means for removing particular material collected on the outer surface of said element comprising means for moving the closed end of the tube upwardly and downwardly to distort said tube, said means for moving the closed end of the tube including a rod having one end attached to the closed end of the tube and extending transverse thereto, means coupling said rod to a motor means for raising and lowering said rod while allowing the rotation of said rod about its axis whereby the particulate material collected on the outer surface of the element breaks from the outer surface.

12. An apparatus in accordance with claim 11 wherein said last named means comprises a rotatable drive shaft mounted on said housing, means for rotating said shaft, motion transmitting means connected to said closed end, and means connected between said drive shaft and said motion transmitting means for converting said drive shaft rotation into a predetermined pattern of movement and imparting said pattern of movement to said motion transmitting means and said closed end of said filter.

* * * * *